(12) United States Patent
Jiang et al.

(10) Patent No.: US 10,649,570 B2
(45) Date of Patent: May 12, 2020

(54) FORCE DETECTION APPARATUS AND METHOD, TOUCH DEVICE AND ELECTRONIC TERMINAL

(71) Applicant: SHENZHEN GOODIX TECHNOLOGY CO., LTD., Shenzhen (CN)

(72) Inventors: Hong Jiang, Shenzhen (CN); Mengta Yang, Shenzhen (CN); Fuchiang Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/678,110

(22) Filed: Aug. 16, 2017

(65) Prior Publication Data

US 2017/0364191 A1 Dec. 21, 2017

Related U.S. Application Data

(63) Continuation of application No. PCT/CN2016/085904, filed on Jun. 15, 2016.

(51) Int. Cl.
G06F 3/041 (2006.01)
G01L 1/14 (2006.01)
(Continued)

(52) U.S. Cl.
CPC ............ *G06F 3/0414* (2013.01); *G01L 1/144* (2013.01); *G01L 1/146* (2013.01); *G06F 3/017* (2013.01);
(Continued)

(58) Field of Classification Search
CPC ....... G06F 3/044; G06F 3/0414; G06F 3/0418
See application file for complete search history.

(56) References Cited

U.S. PATENT DOCUMENTS 8,860,440 B2 * 10/2014 Balachandran ...... G01D 5/2417
324/672
10,007,371 B2 6/2018 Kim et al.
(Continued)

FOREIGN PATENT DOCUMENTS

CN 104142206 A 11/2014
CN 105222931 A 1/2016
(Continued)

*Primary Examiner* — Yuzhen Shen

(57) ABSTRACT

Embodiments of the present disclosure provide a force detection apparatus and method, a touch device and an electronic terminal. The apparatus includes: a first detection capacitor, and a second detection capacitor configured to perform differential processing for a capacitance of the first detection capacitor to cancel an interference signal; wherein the first detection capacitor includes a force detection electrode, and the second detection capacitor includes a reference detection electrode, the force detection electrode and the reference detection electrode being arranged within a surface, such that the first detection capacitor and the second detection capacitor are simultaneously coupled to the interference signal causing interference to force detection, and differential processing is performed for capacitances of the first detection capacitor and the second detection capacitor. In this way, the interference signal, for example, which caused by a display device, is canceled, and sensitivity of force detection is enhanced while temperature drift is inhibited.

17 Claims, 5 Drawing Sheets

(51) Int. Cl.
  *G06F 3/01* (2006.01)
  *G06F 3/044* (2006.01)
  *G06F 3/0488* (2013.01)

(52) U.S. Cl.
  CPC ............ *G06F 3/044* (2013.01); *G06F 3/0412* (2013.01); *G06F 3/0416* (2013.01); *G06F 3/04883* (2013.01)

(56) References Cited

U.S. PATENT DOCUMENTS

| | | | |
|---|---|---|---|
| 2007/0268272 A1* | 11/2007 | Perski | G06F 3/044 345/173 |
| 2010/0315363 A1* | 12/2010 | Kobayashi | G06F 3/0416 345/173 |
| 2013/0257786 A1 | 10/2013 | Brown et al. | |
| 2016/0349906 A1* | 12/2016 | Lee | G06F 3/0416 |
| 2017/0115774 A1* | 4/2017 | Otagaki | G06F 3/044 |
| 2017/0269756 A1* | 9/2017 | Wang | G06F 3/0414 |
| 2017/0315662 A1* | 11/2017 | Reynolds | G06F 3/0414 |
| 2018/0150172 A1* | 5/2018 | Hao | G06F 3/0412 |

FOREIGN PATENT DOCUMENTS

| | | |
|---|---|---|
| CN | 105302398 A | 2/2016 |
| CN | 205809842 U | 12/2016 |
| JP | 2015111317 A | 6/2015 |
| KR | 1020110061637 A | 6/2011 |
| KR | 1020110099625 A | 9/2011 |
| KR | 10-2016-0016584 A | 2/2016 |

* cited by examiner

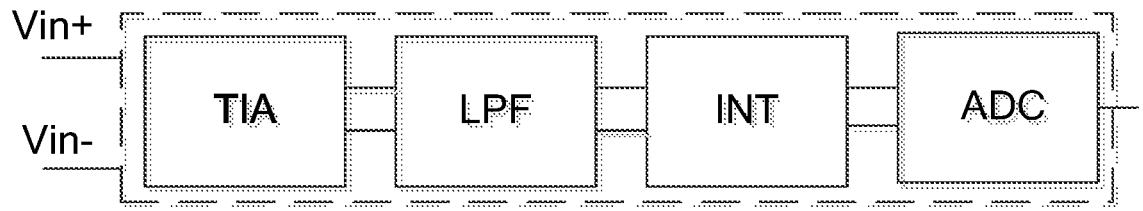

FIG. 9

| Detect capacitances of a first detection capacitor including force detection electrodes and a second detection capacitor including a reference detection electrode, where the force detection electrodes and the reference detection electrode are arranged within a surface, such that the first detection capacitor and the second detection capacitor are simultaneously coupled to the interference signal causing interference to force detection | S1001 |

| Perform differential processing for the capacitances of the first detection capacitor and the second capacitor during force detection to cancel the interference signal to determine a force value | S1002 |

FIG. 10

FORCE DETECTION APPARATUS AND METHOD, TOUCH DEVICE AND ELECTRONIC TERMINAL

CROSS-REFERENCE TO RELATED APPLICATIONS

This application is a continuation of International Patent Application No. PCT/CN2016/085904, with an international filing date of Jun. 15, 2016, which is hereby incorporated by reference in its entireties.

TECHNICAL FIELD

Embodiments of the present disclosure relate to the field of touch technologies, and in particular, relate to a force detection apparatus and method, a touch device and an electronic terminal.

BACKGROUND

The touch technology, when applied to a smart terminal, enables a user to operate the terminal only by means of gesture operations. As such, a traditional mechanical keyboard is not needed, such that man-machine interaction is simpler and more direct.

However, with development of the touch technology, using capacitive touch as an example, pure finger-based touch may not accommodate user's needs in multi-dimensional inputs. Applying the force detection technology to a capacitive touch screen increases an input dimension, and enables the touch screen to sense force information of a finger, sense a force and a light press or a heavy press, and achieve different functions, such that a good user experience is provided. For example, in the touch screen force detection technology, generally, changes of an effective grounding capacitance are detected using a sensor, which, in combination with a display device, to implement touch display.

In one circumstance of the prior art, a layer of OCA adhesive is arranged on an upper surface of the middle frame of a device, and a force detection electrode is arranged on an upper surface of the layer of OCA adhesive. When being pressed by a finger, the effective grounding capacitance of the force detection electrode becomes greater. Specifically, since the distance of the force detection electrode relative to a common reference electrode (Vcom layer) in the display device changes smaller due to a press force from the finger, the effective grounding capacitance becomes greater.

In another circumstance of the prior art, a layer of OCA adhesive is arranged on a lower surface of the display device, and a force detection electrode is arranged on a lower surface of the layer of OCA adhesive. Since the distance of the force detection electrode relative to the middle frame of a mobile phone becomes smaller due to a press force from the finger, the effective grounding capacitance becomes greater. Therefore, the force given by the finger press may be calculated by detecting changes of the effective grounding capacitance.

However, a load grounding capacitor is also existed. The load grounding capacitor is formed between the force detection electrode and the middle frame, and the load grounding capacitor may cause adverse impacts to detection of the effective grounding capacitance, which causes interference to the effective grounding capacitance. In addition, the display device also causes interference to the effective grounding capacitance. Therefore, the interference may cause adverse impacts to sensitivity of detection of the effective grounding capacitance, and further lowers sensitivity of force detection.

To address the interference caused by the display device, a shielding layer is configured in the prior art. The shielding layer is arranged between the display device and the force detection electrode. However, adding such a shielding layer may increase the cost, and increase the entire thickness of the display screen. With respect to the interference caused by the load grounding capacitor, the prior art has not provided a technical solution.

SUMMARY

Embodiments of the present disclosure are intended to provide a force detection apparatus and method, a touch device and an electronic terminal, to solve the above problem in the prior art.

To achieve the objectives of the present disclosure, the embodiments of the present disclosure provides a force detection apparatus, including: a first detection capacitor, and a second detection capacitor configured to perform differential processing for a capacitance of the first detection capacitor to cancel an interference signal; where the first detection capacitor includes a force detection electrode, and the second detection capacitor includes a reference detection electrode, the force detection electrode and the reference detection electrode being arranged within a surface, such that the first detection capacitor and the second detection capacitor are simultaneously coupled to the interference signal causing interference to force detection.

The embodiments of the present disclosure further provide a force detection method, including:

detecting capacitances of a first detection capacitor including a force detection electrode and a second detection capacitor including a reference detection electrode, where the force detection electrode and the reference detection electrode are arranged within a surface, such that the first detection capacitor and the second detection capacitor are simultaneously coupled to the interference signal causing interference to force detection; and performing differential processing for the capacitances of the first detection capacitor and the second capacitor during force detection to cancel the interference signal to determine a force value.

The embodiments of the present disclosure further provide a touch device, including the force detection apparatus according to the embodiments of the present disclosure.

The embodiments of the present disclosure further provide an electronic terminal, including the touch device according to the embodiments of the present disclosure.

In the embodiments of the present disclosure, since the first detection capacitor includes the force detection electrode, the second detection capacitor includes the reference detection electrode, and the force detection electrode and the reference detection electrode are arranged within a surface, the interference signal causing interference to force detection is coupled to both the first detection capacitor and the second detection capacitor, and differential processing is performed for the capacitances of the first detection capacitor and the second detection capacitor so as to cancel the interference signal therein, for example, an interference signal caused by the display device. In this way, sensitivity of force detection is enhanced with no need to increasing the thickness of the product.

In the meantime, when the temperature changes, in one aspect, since the reference detection electrode and the force detection electrode are configured within a surface, the distance therebetween is small; in another aspect, since the temperature change is also reflected on the first detection capacitor and the second detection capacitor, the temperature change exerts an equivalent impact on both the first detection capacitor and the second detection capacitor. When differential processing is performed, the impact is canceled, such that temperature drift is suppressed.

BRIEF DESCRIPTION OF THE DRAWINGS

FIG. 9 is a schematic structural diagram of a differential circuit according to Embodiment 9 of the present disclosure; and FIG. 10 is a schematic flowchart of a force detection method according to Embodiment 10 of the present disclosure.

DETAILED DESCRIPTION

Figure 1:
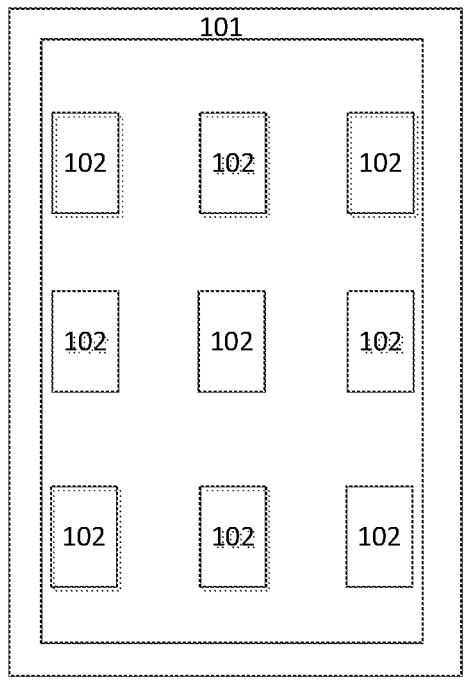
FIG. 1 is a schematic plane diagram of a force detection apparatus according to Embodiment 1 of the present disclosure.

Practice of the present disclosure is described in detail with reference to drawings and specific embodiments, such that the practice of addressing the technical problem using the technical means according to the present disclosure and achieving the technical effects may be better understood and conducted.

The embodiments described hereinafter of the present disclosure propose an inventive concept of a force detection apparatus, including: a first detection capacitor, and a second detection capacitor configured to perform differential processing for a capacitance of the first detection capacitor to cancel an interference signal; where the first detection capacitor includes a force detection electrode, and the second detection capacitor includes a reference detection electrode, the force detection electrode and the reference detection electrode being arranged within a surface, such that the first detection capacitor and the second detection capacitor are simultaneously coupled to the interference signal causing interference to force detection.

In the embodiments of the present hereinafter, the technical solutions according to the present disclosure are interpreted using interference caused by a display device as an example. However, it should be noted that other interference resources may also be present, which are not described herein any further.

In the embodiments of the present disclosure hereinafter, since the force detection electrode and the reference detection electrode are arranged within a surface, the interference signal causing interference to force detection is coupled to both the first detection capacitor and the second detection capacitor, and differential processing is performed for the capacitances of the first detection capacitor and the second detection capacitor so as to cancel the interference signal therein, for example, an interference signal caused by the display device. In this way, sensitivity of force detection is enhanced with no need to increasing the thickness of the product.

In the meantime, when the force detection apparatus is subjected to temperature change due to power-on, in one aspect, since the reference detection electrode and the force detection electrode are configured within a surface, the distance therebetween is small; in another aspect, since the temperature change is also reflected on the first detection capacitor and the second detection capacitor, the temperature change exerts an equivalent impact on both the first detection capacitor and the second detection capacitor. When differential processing is performed, the impact is canceled, such that temperature drift is suppressed.

For example, $Cx$ denotes the first detection capacitor, and $Cref$ denotes the second detection capacitor. Assume that $Cx-Cref=\Delta C$ when the temperature is T1. When the temperature changes to T2, $Cx$ and $Cref$ are both changed to $Cx+\Delta Cx$ and $Cref+\Delta Cref$ respectively. Further, since the electrodes of $Cx$ and $Cref$ are very close to each other and $\Delta Cx \approx \Delta Cref$, $Cx+\Delta Cx-(Cref+\Delta Cref)=Cx+-Cref+(\Delta Cx-\Delta Cref) \approx \Delta C$. As such, the temperature drift is significantly suppressed.

FIG. 1 is a schematic surface diagram of a force detection apparatus according to Embodiment 1 of the present disclosure. As illustrated in FIG. 1, a reference detection electrode 101 and force detection electrodes 102 are arranged within a surface, a plurality of force detection electrodes form a force detection electrode array, and the reference detection electrode is arranged in the periphery of the force detection electrode array. In this embodiment, one reference detection electrode 101 is used whereas nine force detection electrodes 102 are used, the reference detection electrode 101 is an annular electrode with a rectangular shape which surrounds the force detection electrode array formed by the nine force detection electrodes 102.

Figure 2:
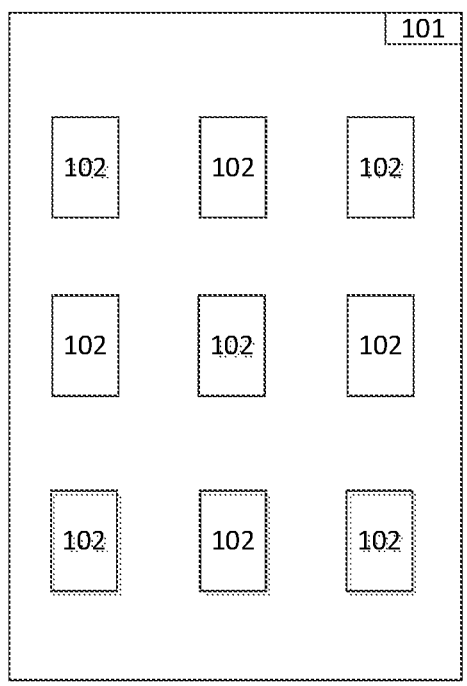
FIG. 2 is a schematic plane diagram of a force detection apparatus according to Embodiment 2 of the present disclosure.

FIG. 2 is a schematic plane diagram of a force detection apparatus according to Embodiment 2 of the present disclosure. Different from the above embodiment, the reference detection electrode 101 is a rectangular electrode, which is located at the upper right corner of the force detection electrode array formed by the nine force detection electrodes 102.

Figure 3:
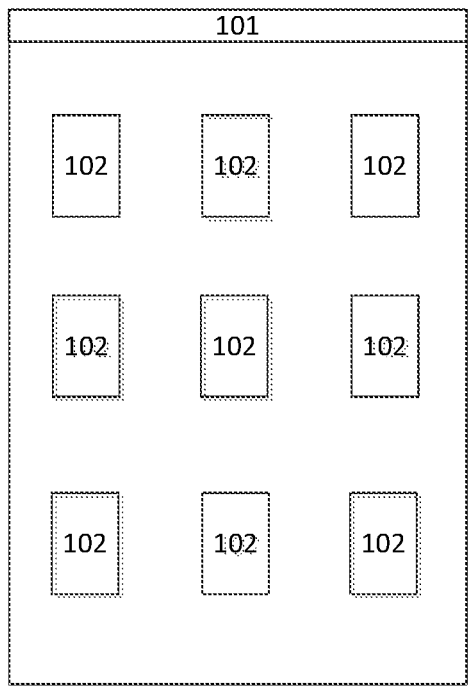
FIG. 3 is a schematic plane diagram of a force detection apparatus according to Embodiment 3 of the present disclosure.

FIG. 3 is a schematic plane diagram of a force detection apparatus according to Embodiment 3 of the present disclosure. Different from the above embodiment, the reference detection electrode 101 is a strip-like electrode, which is located at the top of the force detection electrode array formed by the nine force detection electrodes 102.

The embodiments illustrated in FIG. 1 to FIG. 3 merely schematically describe the scenario where one reference detection electrode corresponds to a plurality of detection electrodes. However, a plurality of reference detection electrodes may also correspond to a plurality of force detection electrodes.

The shape and arrangement position of the reference detection electrode are not limited to the specific cases illustrated in FIG. 1 to FIG. 3, and other shapes and arrangement positions may also applicable. For example, the shape of the reference detection electrode may be a rectangle, a circle, an ellipse, a trapezium, a long stripe or any regular or irregular shape. For example, considering that during differential detection, the impact caused by the reference detection electrode to the force detection electrodes is minimized, the capacitance of the first detection capacitor is greater than the capacitance of the second detection capacitor, which is implemented by, for example, designing the area of the reference detection electrode to be less than the area of the force detection electrode.

The reference detection electrode may be arranged in the periphery of the force detection electrode array, as described in the embodiments as illustrated FIG. 1 to FIG. 3. In other embodiments, the reference detection electrode may be arranged at any corner, on any edge, at a plurality of corners or on a plurality of edges. When the reference detection electrode is arranged in the periphery, since deformation of the second formed detection capacitor formed by the reference detection electrode is relatively small when the force detection apparatus deforms under a force, the area of the reference detection electrode may be equal to the area of the force detection electrode.

In addition, the reference detection electrode may also be arranged in the middle of the force detection electrode array. For example, the reference detection electrode is alternatively arranged in a plurality of force detection electrodes. For example, one reference detection electrode is arranged between the first row of force detection electrodes 102 and the second row of force detection electrodes 102, and another reference detection electrode is arranged between the second row of force detection electrodes 102 and the third row of force detection electrodes 102. In this case, the area of a single reference detection electrode is preferably less than the area of a single force detection electrode, such that the impact caused by the reference detection electrode to the force detection electrode is minimized.

The schematic planar arrangements of the reference detection electrode and the force detection electrodes illustrated in FIG. 1 to FIG. 3 may be applicable to self-capacitance detection and may also be applicable to mutual capacitance detection.

Figure 4:
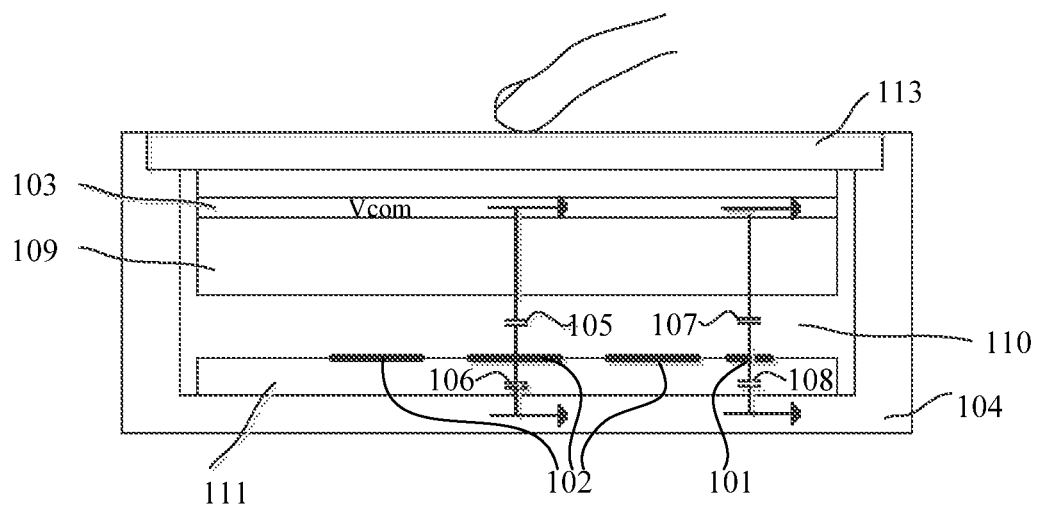
FIG. 4 is a schematic plane diagram of a force detection apparatus according to Embodiment 4 of the present disclosure.

FIG. 4 is a schematic plane diagram of a force detection apparatus according to Embodiment 4 of the present disclosure. As illustrated in FIG. 4, in this embodiment, description is given using self-capacitance detection as an example. The force detection electrodes 102 is respectively coupled to a first conducting surface 103 and a second conducting surface 104 to form a first effective detection capacitor 105 and a first load detection capacitor 106 respectively; the first detection capacitor includes the first effective detection capacitor 105 and the first load detection capacitor 106, and the first effective detection capacitor 105 and the first load detection capacitor 106 are connected in series; the reference detection electrode 101 is respectively coupled to the first conducting surface 103 and the second conductive surface 104 to form a second effective detection capacitor 107 and a second load detection capacitor 108 respectively, and the second detection capacitor includes the second effective detection capacitor 107 and the second load detection capacitor 108, and the second effective detection capacitor 107 and the second load detection capacitor 108 are connected in series.

In this embodiment, the first conducting surface 103 is a common reference electrode which is commonly used by a display device 109 and the force detection electrodes 102. Due to self-capacitance detection, the force detection electrodes 102 needs to receive an exciting signal TX. The second conducting surface 104 is a conducting middle frame of a terminal including the force detection apparatus.

In this embodiment, an OCA adhesive 111 is arranged on an inner side of the conducting middle frame 104, and the force detection electrodes 102 is adhered on an upper surface of the OCA adhesive 111. The terminal including the force detection apparatus includes the display device 109, and a gap 110 is formed between the display device 109 and the force detection electrodes 102. When a cover 113 is under force, the gap 110 varies with the change of the force, which causes the capacitances of the first detection capacitor and the second detection capacitor to change.

It should be noted that, in other embodiments, the second conducting surface 104 may also be a conducting back shell of the terminal including the force detection apparatus, which is not described any further in the drawings.

In another embodiment, the first conducting surface is a common reference electrode whereas the second conducting surface may be selected from the force detection apparatus and the conducting structures of the terminal, or the second conducting surface is the conducting back shell or the conducting middle frame of the terminal including the force detection apparatus whereas the first conducting surface may be selected from the force detection apparatus and the conducting structures of the terminal.

Figure 5:
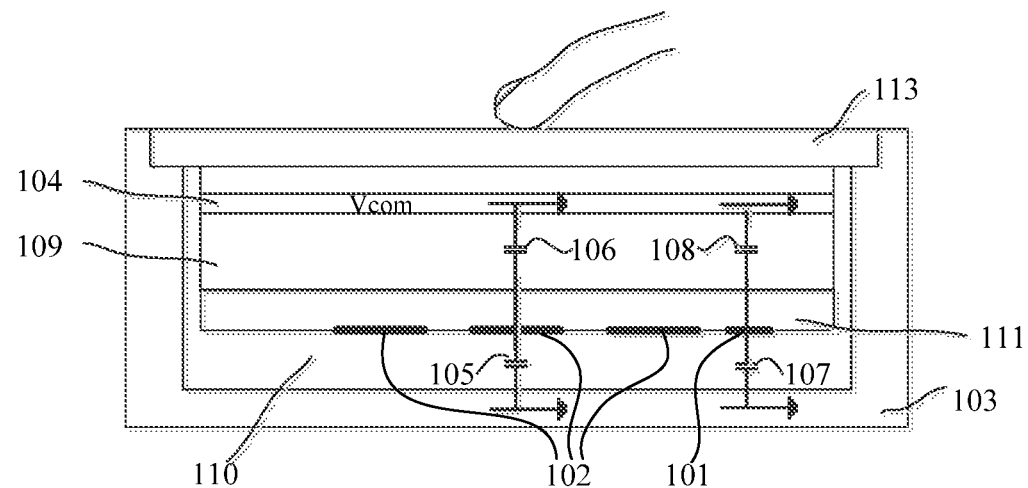
FIG. 5 is a schematic plane diagram of a force detection apparatus according to Embodiment 5 of the present disclosure.

FIG. 5 is a schematic plane diagram of a force detection apparatus according to Embodiment 5 of the present disclosure. As illustrated in FIG. 5, in this embodiment, description is given still using a self-capacitor as an example.

This embodiment is different from the above embodiment in that the first conducting surface 103 is a conducting middle frame of a terminal including the force detection apparatus, and the second conducting surface 104 is a common reference electrode. That is, in this embodiment, the force detection electrodes 102 is respectively coupled to the conducting middle frame acting as the first conducting surface 103 and the common reference electrode acting as the second conducting surface 104 to form the first effective detection capacitor 105 and the first load detection capacitor 106 respectively; the first detection capacitor includes the first effective detection capacitor 105 and the first load detection capacitor 106, and the first effective detection capacitor 105 and the first load detection capacitor 106 are connected in series; the reference detection electrode 101 is respectively coupled to the conducting middle frame acting as the first conducting surface 103 and the common reference electrode acting as the second conductive surface 104 to form the second effective detection capacitor 107 and the second load detection capacitor 108 respectively, and the second detection capacitor includes the second effective detection capacitor 107 and the second load detection capacitor 108, and the second effective detection capacitor 107 and the second load detection capacitor 108 are connected in series.

In this embodiment, the OCA adhesive 111 is arranged on a lower surface of the display device 109, the force detection electrodes 102 is adhered to a lower surface of the OCA adhesive 111, a gap 110 is formed between the force detection electrodes 102 and the conducting middle frame, and when the cover 113 is under force, the gap 110 varies with the change of the force, which causes the capacitances of the first detection capacitor and the second detection capacitor to change.

It should be noted that, in other embodiments, the first conducting surface 103 may also be a conducting back shell of the terminal including the force detection apparatus, which is not described any further in the drawings.

Figure 6:
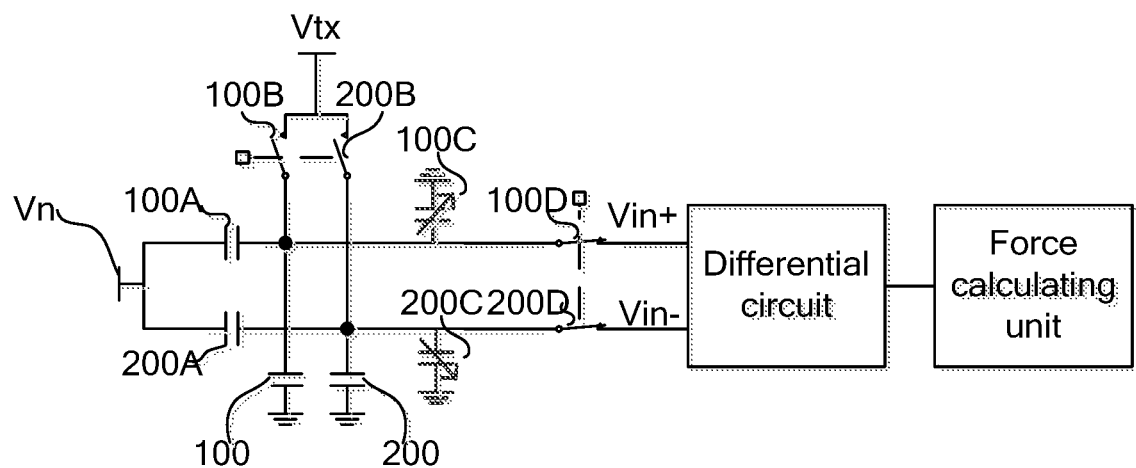
FIG. 6 is a schematic plane diagram of an equivalent circuit of a force detection apparatus according to Embodiment 6 of the present disclosure.

FIG. 6 is a schematic plane diagram of an equivalent circuit of a force detection apparatus according to Embodiment 6 of the present disclosure. As illustrated in FIG. 6, a first detection capacitor 100 is connected to a positive input terminal Vin+ of a differential circuit, and a second detection capacitor 200 is connected to a negative input terminal Vin− of the differential circuit. The differential circuit may be implemented using a fully differential amplifier, or may be implemented using a two-path single-end amplifier, which is not described herein any further. The fully differential amplifier may better suppress common-mode noise.

In this embodiment, the display device 109 and the first conducting surface form a first coupling capacitor 100A, and the display device and the second conducting surface form a second coupling capacitor 200A. During force detection, the capacitance of the first coupling capacitor 100A is the same as the capacitance of the second coupling capacitor 200A. The first coupling capacitor 100A and the first detection capacitor 100 are connected in series, and the second coupling capacitor 200 and the second detection capacitor 200A are connected in series, such that the interference signal causing interference to force detection is coupled to both the first detection capacitor 100 and the second detection capacitor 200. The first coupling capacitor 100A and the second coupling capacitor 200A are simultaneously coupled to interference caused by an interference voltage Vn from the display device. Since the capacitances of the first coupling capacitor 100A and the second coupling capacitor 200A are the same, the interference is canceled in the subsequent differential processing.

In this embodiment, the first detection capacitor 100 is electrically connected to a first adjustable capacitor 100C, and the second detection capacitor 200 is electrically connected to a second adjustable capacitor 200C. A matching relationship between the capacitances of the first detection capacitor 100 and the second detection capacitor 200 during force detection by adjusting the first adjustable capacitor 100C and the second adjustable capacitor 200C, including adjusting the capacitance of the first detection capacitor to be greater than, equal to or less than the capacitance of the second detection capacitor. In other embodiments, the first adjustable capacitor 100C and the second adjustable capacitor 200C are not necessarily configured simultaneously, which may be alternatively configured.

Specifically, the capacitance of the first detection capacitor is designed to be a little bit greater, and when a finger presses the capacitors to cause the capacitances of the first detection capacitor and the second detection capacitor to increase, the circuit may obtain a positive voltage output, and a force calculating unit may calculate the force according to the positive voltage, thereby implementing force sensing. In addition, the first adjustable capacitor 100C and/or the second adjustable capacitor 200C is used, such that the output of the differential circuit is 0 in the case where no force is applied. For example, the first adjustable capacitor 100C is singly adjusted, and/or the first adjustable capacitor 100C and the second adjustable capacitor 200C are simultaneously adjusted in consideration of presence of assembly error, such that the output of the differential circuit is 0 in the case where no force is applied.

In this embodiment, optionally, the first detection capacitor 100 is electrically connected to the first switch circuit 100B, and/or the second detection capacitor 200 is electrically connected to the second switch circuit 200B, such that the first detection capacitor 100 is charged or discharged using the first switch circuit 100B and the second detection capacitor 200 is charged or discharged using the second switch circuit 200B during force detection.

In this embodiment, optionally, the positive terminal is electrically connected to a third switch circuit 100D, the negative terminal is electrically connected to a fourth switch circuit 200D, the first detection capacitor is electrically connected to the positive terminal via the third switch circuit 100D, and the second detection capacitor is electrically connected to the negative terminal via the fourth switch circuit 200D.

The first switch circuit 100B and the second switch circuit 200B are switched on, while the third switch circuit 100D and the fourth switch circuit 200D are switched off, to charge the first detection capacitor 100 and the second detection capacitor 200 to Vtx; and the first switch circuit 100B and the second switch circuit 200B are switched off, while the third switch circuit 100D and the fourth switch circuit 200D are switched on, to cause the first detection capacitor 100 and the second detection capacitor 200 to enter a discharge state. In this case, since the capacitance of the first detection capacitor is designed to be greater than the capacitance of the second detection capacitor, the first adjustable capacitor 100C and the second adjustable capacitor 200C are adjusted such that the output of the differential circuit is 0 when no force is applied. When a force is applied for force detection, the capacitance change of the first detection capacitor is greater than the capacitance change of the second detection capacitor, such that the differential circuit output a positive voltage, and the force calculating unit may calculate the force according to the positive voltage, thereby implementing force sensing.

It should be noted that the capacitance of the first detection capacitor may also be designed to be less than the capacitance of the second detection capacitor, and the force may be calculated according to a negative voltage output by the differential circuit during force detection by adjustment of the first adjustable capacitor and/or the second adjustment capacitor, which is not described any further in the drawings.

It should be noted that, in other embodiment, the first switch circuit 100B, the second switch circuit 200B, the first adjustable capacitor 100C and the second adjustable capacitor 200C are not necessarily structures included in the force detection apparatus, which may be independent of the force detection apparatus and not included in the force detection apparatus. In other embodiments, the first switch circuit 100B, the second switch circuit 200B, the first adjustable capacitor 100C and the second adjustable capacitor 200C are not necessarily configured simultaneously, which may be alternatively configured according to the actual needs.

Figure 7:
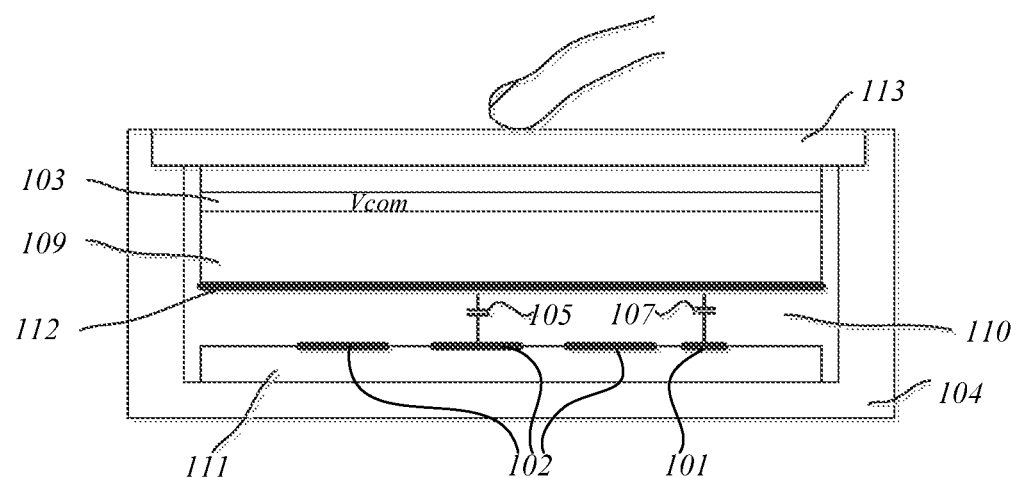
FIG. 7 is a schematic plane diagram of a force detection apparatus according to Embodiment 7 of the present disclosure.

FIG. 7 is a schematic plane diagram of a force detection apparatus according to Embodiment 7 of the present disclosure. As illustrated in FIG. 7, description is given in this embodiment using mutual capacitance detection as an example, and the force detection apparatus further includes a force driving electrode 112.

In this embodiment, the force detection electrodes 102 is coupled to the force driving electrode 112 to form a first effective mutual capacitor, where the first effective mutual capacitor is the first detection capacitor 100; and the reference detection electrode 101 is coupled to the force driving electrode 112 to form a second effective mutual capacitor, where the second effective mutual capacitor is the second detection capacitor 200.

This embodiment is different from the above embodiment in that the force driving electrode 112 is arranged on a lower surface of the display device 109, where a gap 110 is formed between the force driving electrode 112 and the force detection electrodes 102.

It should be noted that the arrangement positions of the force detection electrodes and the force driving electrode may be exchanged as long as the force detection electrodes and the reference detection electrode are within a surface, which are not described any further in the drawings.

In addition, in this embodiment, description is given using two layers of electrodes, that is, a force driving electrode and force detection electrodes, as an example. The technical solution according to the present disclosure may be applied to a plurality of layers of electrodes, as long as the force detection electrode and the reference detection electrode are arranged within a surface, which is not described in the drawings any further.

Figure 8:
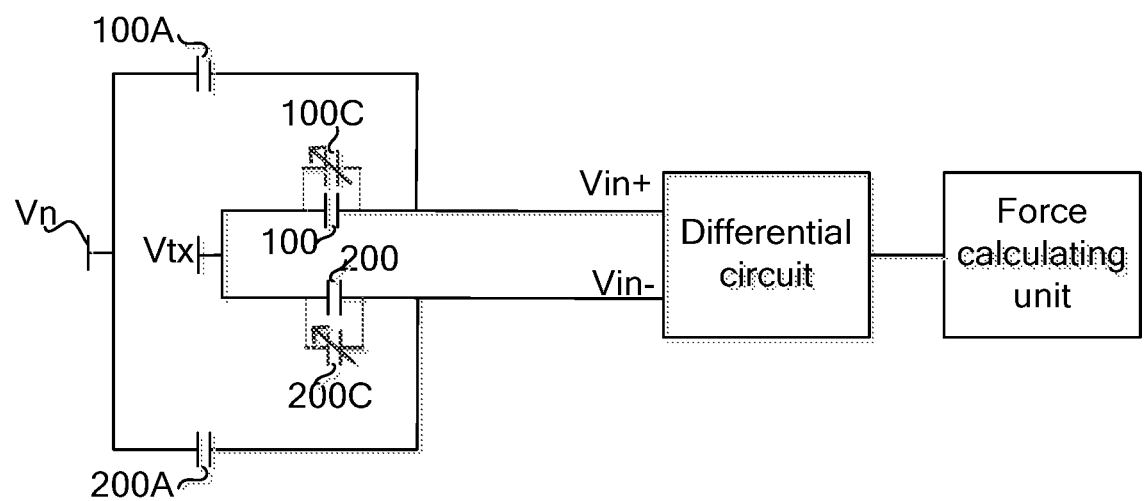
FIG. 8 is a schematic plane diagram of an equivalent circuit of a force detection apparatus according to Embodiment 8 of the present disclosure.

FIG. 8 is a schematic plane diagram of an equivalent circuit of a force detection apparatus according to Embodiment 8 of the present disclosure. As illustrated in FIG. 8, this embodiment is different from the embodiment illustrated in FIG. 6 in that with regard to the circumstance illustrated in FIG. 7, the adjustable capacitors 100C and 200C are directly bridged to two terminals of the first detection capacitor 100 and the second detection capacitor 200, and the first detection capacitor 100 and the second detection capacitor 200 are both mutual capacitors instead of self-capacitors. The first coupling capacitor 100A and the second coupling capacitor 200A are respectively coupled to one side of the first detection capacitor 100 and the second detection capacitor 200A close to the input terminal of the differential circuit.

FIG. 9 is a schematic structural diagram of a differential circuit according to Embodiment 9 of the present disclosure. As illustrated in FIG. 9, the differential circuit may include: a TIA circuit, configured to implement conversion of a capacitance difference to a voltage difference; a low-pass filter (LPF) circuit, configured to filter interference in a voltage difference signal and enhance the anti-interference capability of the circuit; an INT circuit, configured to integrating a small voltage difference signal to a great voltage difference signal to enhance the SNR; and an ADC circuit, configured to implement digital quantization of the voltage difference signal, such that the force calculating module performs force calculation based on a voltage difference digital signal.

FIG. 10 is a schematic flowchart of a force detection method according to Embodiment 10 of the present disclosure. As illustrated in FIG. 10, in this embodiment, force detection electrodes and a reference detection electrode are arranged within a surface, an interference signal causing interference to force detection is coupled to a first detection capacitor and a second detection capacitor simultaneously. Specifically, for example, a display device and a first conducting surface form a first coupling capacitor, and the display device and a second conducting surface form a second coupling capacitor. The first coupling capacitor and the first detection capacitor are connected in series, and the second coupling capacitor and the second detection capacitor are connected in series. The capacitances of the first coupling capacitor and the second coupling capacitor are the same during force detection, such that the interference signal causing interference to force detection is coupled to the first detection capacitor and the second detection capacitor simultaneously. With respect to self-capacitance detection, in this embodiment, the first conducting surface and the second conducting surface may be configured by reference to the embodiment illustrated in FIG. 4 or FIG. 5, which is thus not described herein any further. With respect to mutual capacitance detection, the first conducting surface and the second conducting surface may be configured by reference to the embodiment illustrated in FIG. 7, which is thus not described herein any further.

The detection method in this embodiment specifically includes the following steps:

S1001: Capacitances of a first detection capacitor including force detection electrodes and a second detection capacitor including a reference detection electrode are detected, where the force detection electrodes and the reference detection electrode are arranged within a surface, such that the first detection capacitor and the second detection capacitor are simultaneously coupled to the interference signal causing interference to force detection.

In this embodiment, with respect to self-capacitance detection, step S1001 may include:

S1011A: Capacitances of a first effective detection capacitor formed by coupling of the force detection electrodes and the first conducting surface and of a first load detection capacitor formed by coupling of the force detection electrodes and the second conducting surface are detected, where the first detection capacitor includes the first effective detection capacitor and the first load detection capacitor.

In this embodiment, the first effective detection capacitor and the first load detection capacitor are connected in series.

S1021A: Capacitances of a second effective detection capacitor formed by coupling of the reference detection electrode and the first conducting surface and of a second load detection capacitor formed by coupling of the reference detection electrode and the second conducting surface are detected, where the second detection capacitor includes the second effective detection capacitor and the second load detection capacitor.

In this embodiment, the second effective detection capacitor and the second load detection capacitor are connected in series.

With respect to mutual capacitance detection, step S1001 may include:

S1011B: detecting a capacitance of a first effective mutual capacitor formed by coupling of the force detection electrodes and a force driving electrode, where the first effective mutual capacitor is the first detection capacitor; and S1021B: detecting a capacitance of a second effective mutual capacitor formed by coupling of the reference detection electrode and the force driving electrode, where the second effective mutual capacitor is the second detection capacitor.

S1002: Differential processing is performed for the capacitances of the first detection capacitor and the second capacitor during force detection to cancel the interference signal to determine a force value.

In this embodiment, in step S1002, differential processing may be specifically performed for the capacitances of the first detection capacitor and the second detection capacitor by electrically connecting the first detection capacitor to a positive terminal of the differential circuit and electrically connecting the second detection capacitor to a negative terminal of the differential circuit. Specifically, for example, the first detection capacitor is connected to the positive terminal via a third switch circuit, where the positive terminal is electrically connected to the third switch circuit, and the second detection capacitor is electrically connected to the negative terminal via a fourth switch circuit, where the negative terminal is electrically connected to the fourth switch circuit, such that differential processing is performed for the capacitances of the first detection capacitor and the second detection capacitor.

During differential processing, assume that there are N reference detection electrodes, M force detection electrodes, and M and N are both an integer greater than 0, then:

(1) When N=1 and M>1, difference calculation is performed between the first detection capacitors corresponding to the M force detection electrodes and the second detection capacitor corresponding to the one reference detection electrode.

(2) When N≥2 and M>1, difference calculation is performed between the second detection capacitors corresponding to the N reference detection electrodes and the first detection capacitors corresponding to N force detection electrodes among the M force detection electrodes, until the difference processing is completed for the first detection capacitors corresponding to the M force detection electrodes.

(3) When N=M, that is when each force detection electrode corresponds to one reference detection electrode, one-to-one capacitance difference calculation is performed for the first detection capacitors corresponding to the M force detection electrodes and the N force detection electrodes.

In this embodiment, during force detection, the first detection capacitor and/or the second detection capacitor is charged or discharged using the switch circuit. Details about charging and discharging the first detection capacitor and the second detection capacitor are referenced to the embodiment illustrated in FIG. 6, which are thus not described herein any further.

In another embodiment, before step S1001, the method further includes: adjusting the capacitance of the first detection capacitor to be greater than, equal to or less than the capacitance of the second detection capacitor during force detection using a first adjustable capacitor electrically connected to the first detection capacitor, and/or using a second adjustable capacitor electrically connected to the second detection capacitor. The matching relationship between the capacitances may be specifically defined before the charging and discharging steps.

In this embodiment, the method for setting the capacitances of the first detection capacitor and the second detection capacitor may be referenced to the embodiment illustrated in FIG. 6, which is thus not described herein any further.

In this embodiment, the relevant methods may be specifically referenced to the above apparatus embodiment, which are thus not described herein any further.

An embodiment of the present disclosure further provides a touch device which is capable of using the force detection apparatus according to any of the above embodiments, and an electronic terminal using the touch device, for example, a smart phone, a tablet computer, a smart television or the like.

It should be noted that, in the above embodiments, the expression "within a surface" may be within a plane or may be within a curved surface.

The apparatus according to the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present disclosure is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A force detection apparatus, comprising:
a differential circuit;
a first detection capacitor connected to the differential circuit; and a second detection capacitor connected to the differential circuit and configured to perform differential processing for a capacitance of the first detection capacitor to cancel an interference signal;

wherein the first detection capacitor comprises a force detection electrode, and the second detection capacitor comprises a reference detection electrode, the force detection electrode and the reference detection electrode being arranged within a surface, such that the first detection capacitor and the second detection capacitor are simultaneously coupled to the interference signal causing interference to force detection, the capacitance of the first detection capacitor is greater than a capacitance of the second detection capacitor for force detection with an area of the reference detection electrode being less than an area of the force detection electrode, and wherein the first detection capacitor is electrically connected to a first adjustable capacitor configured to adjust the capacitance of the first detection capacitor during force detection, and the first adjustable capacitor is grounded, and/or the second detection capacitor is electrically connected to a second adjustable capacitor configured to adjust capacitance of the second detection capacitor during force detection, and the second adjustable capacitor is grounded.

2. The apparatus according to claim 1, wherein the force detection electrode is respectively coupled to a first conducting surface and a second conducting surface to form a first effective detection capacitor and a first load detection capacitor respectively; the first detection capacitor comprises the first effective detection capacitor and the first load detection capacitor, the first effective detection capacitor and the first load detection capacitor being connected in series; the reference detection electrode is respectively coupled to the first conducting surface and the second conductive surface to form a second effective detection capacitor and a second load detection capacitor respectively, the second effective detection capacitor and the second load detection capacitor being connected in series; and the second detection capacitor comprises the second effective detection capacitor and the second load detection capacitor.

3. The apparatus according to claim 2, wherein the first conducting surface is a common reference electrode or a conductive back shell or a conductive middle frame of a terminal comprising the force detection apparatus; the second conducting surface is a conductive back shell or a conductive middle frame of a terminal comprising the force detection apparatus or a common reference electrode.

4. The apparatus according to claim 2, wherein the first conducting surface and a display device of a terminal which comprises the force detection apparatus forms a first coupling capacitor, the display device and the second conducting surface forms a second coupling capacitor, and the first coupling capacitor and the second coupling capacitor have an identical capacitance during force detection; and the first coupling capacitor and the first detection capacitor are connected in series and the second coupling capacitor and the second detection capacitor are connected in series, such that the interference signal causing interference to force detection is coupled to both the first detection capacitor and the second detection capacitor.

5. The apparatus according to claim 1, further comprising: a force driving electrode; wherein the force detection electrode is coupled to the force driving electrode to form a first effective mutual capacitor which is the first detection capacitor; and the reference detection electrode is coupled to the force driving electrode to form a second effective mutual capacitor which is the second detection capacitor.

6. The apparatus according to claim 1, wherein the first detection capacitor is electrically connected to a first switch circuit such that the first detection capacitor is charged or discharged using the first switch circuit during force detection; and/or the second detection capacitor is electrically connected to a second switch circuit such that the second detection capacitor is charged or discharged using the second switch circuit during force inspection.

7. The apparatus according to claim 1, wherein the differential circuit comprises a positive terminal and a negative terminal, and the first detection capacitor is electrically connected to the positive terminal and the second detection capacitor is electrically connected to the negative terminal to perform differential processing for the capacitances of the first detection capacitor and the second detection capacitor.

8. The apparatus according to claim 7, wherein the positive terminal is electrically connected to a third switch circuit, the negative terminal is electrically connected to a fourth switch circuit, the first detection capacitor is electrically connected to the positive terminal via the third switch circuit, and the second detection capacitor is electrically connected to the negative terminal via the fourth switch circuit.

9. A force detection method, comprising:

detecting capacitances of a first detection capacitor comprising a force detection electrode and a second detection capacitor comprising a reference detection electrode, the first detection capacitor and the second detection capacitor being both connected to a differential circuit, wherein the force detection electrode and the reference detection electrode are arranged within a surface, such that the first detection capacitor and the second detection capacitor are simultaneously coupled to the interference signal causing interference to force detection, the capacitance of the first detection capacitor is greater than a capacitance of the second detection capacitor for force detection with an area of the reference detection electrode being less than an area of the force detection electrode; and performing differential processing for the capacitances of the first detection capacitor and the second detection capacitor during force detection to cancel the interference signal to determine a force value, wherein the first detection capacitor is electrically connected to a first adjustable capacitor configured to adjust the capacitance of the first detection capacitor during force detection, and the first adjustable capacitor is grounded, and/or the second detection capacitor is electrically connected to a second adjustable capacitor configured to adjust capacitance of the second detection capacitor during force detection, and the second adjustable capacitor is grounded.

10. The method according to claim 9, wherein the detecting capacitances of a first detection capacitor comprising a force detection electrode and a second detection capacitor comprising a reference detection electrode comprises:

detecting capacitances of a first effective detection capacitor and a first load detection capacitor that are formed by coupling of a first conducting surface and a second conducting surface, wherein the first detection capacitor comprises the first effective detection capacitor and the first load detection capacitor, the first effective detection capacitor and the first load detection capacitor are connected in series; and detecting capacitances of a second effective detection capacitor and a second load detection capacitor that are formed by coupling of the first conducting surface and the second conducting surface, wherein the second detection capacitor comprises the second effective detection capacitor and the second load detection capacitor, and the second effective detection capacitor and the second load detection capacitor are connected in series.

11. The method according to claim 10, wherein a display device of a terminal which comprises a force detection apparatus and the first conducting surface form a first coupling capacitor, the display device and the second conducting surface form a second coupling capacitor, the first coupling capacitor and the first detection capacitor is connected in series, the second coupling capacitor and the second detection capacitor are connected in series, and the first coupling capacitor and the second coupling capacitor have an identical capacitance during force detection, such that the interference signal causing interference to force detection is coupled to both the first detection capacitor and the second detection capacitor.

12. The method according to claim 9, wherein the detecting capacitances of a first detection capacitor comprising a force detection electrode and a second detection capacitor comprising a reference detection electrode comprises:
    detecting a capacitance of a first effective mutual capacitor formed by coupling of the force detection electrode and a force driving electrode, wherein the first effective mutual capacitor is the first detection capacitor; and
    detecting a capacitance of a second effective mutual capacitor formed by coupling of the reference detection electrode and the force driving electrode, wherein the first effective mutual capacitor is the second detection capacitor.

13. The method according to claim 9, further comprising: charging or discharging the first detection capacitor during force detection using a first switch circuit electrically connected to the first detection capacitor; and/or charging or discharging the second detection capacitor during force detection using a second switch circuit electrically connected to the second detection capacitor.

14. The method according to claim 9, wherein the performing differential processing for the capacitances of the first detection capacitor and the second detection capacitor during force detection to determine a force value comprises: electrically connecting the first detection capacitor to a positive terminal of the differential circuit and electrically connecting the second detection capacitor to a negative terminal to the differential circuit, to perform differential processing for the capacitances of the first detection capacitor and the second detection capacitor.

15. The method according to claim 14, wherein the electrically connecting the first detection capacitor to a positive terminal of the differential circuit and electrically connecting the second detection capacitor to a negative terminal to the differential circuit, to perform differential processing for the capacitances of the first detection capacitor and the second detection capacitor comprises: electrically connecting the first detection capacitor to the positive terminal via a third switch circuit, electrically connecting the positive terminal to the third switch circuit, electrically connecting the second detection capacitor to the negative terminal via a fourth switch circuit, and electrically connecting the negative terminal to the fourth switch circuit, to perform differential processing for the capacitances of the first detection capacitor and the second detection capacitor.

16. A touch device, comprising a force detection apparatus, the force detection apparatus comprising:
    a differential circuit;
    a first detection capacitor connected to the differential circuit; and
    a second detection capacitor connected to the differential circuit and configured to perform differential processing for a capacitance of the first detection capacitor to cancel an interference signal;
    wherein the first detection capacitor comprises a force detection electrode, and the second detection capacitor comprises a reference detection electrode, the force detection electrode and the reference detection electrode being arranged within a surface, such that the first detection capacitor and the second detection capacitor are simultaneously coupled to the interference signal causing interference to force detection, the capacitance of the first detection capacitor is greater than a capacitance of the second detection capacitor for force detection with an area of the reference detection electrode being less than an area of the force detection electrode, and
    wherein the first detection capacitor is electrically connected to a first adjustable capacitor configured to adjust the capacitance of the first detection capacitor during force detection, and the first adjustable capacitor is grounded, and/or the second detection capacitor is electrically connected to a second adjustable capacitor configured to adjust capacitance of the second detection capacitor during force detection, and the second adjustable capacitor is grounded.

17. An electronic terminal, comprising a touch device, wherein the touch device comprises a force detection apparatus comprising:
    a differential circuit;
    a first detection capacitor connected to the differential circuit; and
    a second detection capacitor connected to the differential circuit and configured to perform differential processing for a capacitance of the first detection capacitor to cancel an interference signal;
    wherein the first detection capacitor comprises a force detection electrode, and the second detection capacitor comprises a reference detection electrode, the force detection electrode and the reference detection electrode being arranged within a surface, such that the first detection capacitor and the second detection capacitor are simultaneously coupled to the interference signal causing interference to force detection, the capacitance of the first detection capacitor is greater than a capacitance of the second detection capacitor for force detection with an area of the reference detection electrode being less than an area of the force detection electrode, and
    wherein the first detection capacitor is electrically connected to a first adjustable capacitor configured to adjust the capacitance of the first detection capacitor during force detection, and the first adjustable capacitor is grounded, and/or the second detection capacitor is electrically connected to a second adjustable capacitor configured to adjust capacitance of the second detection capacitor during force detection, and the second adjustable capacitor is grounded.

* * * * *